United States Patent
Daume et al.

[11] Patent Number: 6,022,487
[45] Date of Patent: Feb. 8, 2000

[54] HEAT-TRANSFER CONCENTRATE, METHOD OF MANUFACTURING IT AND ITS USE AS WELL AS A LATENT-HEAT ACCUMULATOR MAKING USE OF THE CONCENTRATE

[76] Inventors: Jochen Daume, Argonner Weg 29, D-42659 Solingen, Germany; Arnold Grimm, Krautgarten 12, D-35124 Eichenzell, Germany; Heinrich Bauer, Kohlkopfstr 14, D-67661 Kaiserslautern, Germany

[21] Appl. No.: 08/875,787

[22] PCT Filed: Dec. 6, 1995

[86] PCT No.: PCT/EP95/04791

§ 371 Date: Oct. 20, 1997

§ 102(e) Date: Oct. 20, 1997

[87] PCT Pub. No.: WO96/21706

PCT Pub. Date: Jul. 18, 1996

[30] Foreign Application Priority Data

Jan. 14, 1995 [DE] Germany ............... 195 00 040
Apr. 5, 1995 [DE] Germany ............... 195 12 656

[51] Int. Cl.$^7$ ................. C09K 5/00; C09K 5/06
[52] U.S. Cl. ................. 252/70; 252/71; 252/74; 126/910; 165/104.15; 165/104.17
[58] Field of Search .................. 252/70, 71, 74; 165/104.15, 104.17, 902; 126/910

[56] References Cited

U.S. PATENT DOCUMENTS

| | | | |
|---|---|---|---|
| 3,882,033 | 5/1975 | Wright | 252/572 |
| 4,099,557 | 7/1978 | Bricard et al. | 165/104.17 |
| 4,099,558 | 7/1978 | Bricard et al. | 165/104.17 |

FOREIGN PATENT DOCUMENTS

| | | |
|---|---|---|
| 24498 | 3/1981 | European Pat. Off. . |
| 342141 | 11/1989 | European Pat. Off. . |

*Primary Examiner*—Anthony Green
*Attorney, Agent, or Firm*—Jones & Askew, LLP

[57] ABSTRACT

A heat-transfer concentrate comprising a storage-stable dispersion of a heat-storage medium and gallium adsorbed onto a solid having either a particle diameter of 1 to 3 um or a pore diameter of 0.2 to 0.6 nm, or both, is provided. The invention also provides a method of manufacture for the concentrate, and a heat-transfer mixture comprising the heat-transfer concentrate and another heat-storage medium. The invention further provides methods of using the heat-transfer mixture to store and convey heat in reactors with heat exchangers, as well as methods of use in heat pumps and as a thermochemical energy-storage medium.

51 Claims, 1 Drawing Sheet

HEAT-TRANSFER CONCENTRATE, METHOD OF MANUFACTURING IT AND ITS USE AS WELL AS A LATENT-HEAT ACCUMULATOR MAKING USE OF THE CONCENTRATE

The invention pertains to a heat-transfer concentrate, a process for its preparation, as well as its use for thermochemical energy storage for producing chemical heat pumps or for chemical heat transformation, and moreover, a latent heat-storage device.

In direct utilization of solar energy, for example recovery of heat with solar collectors, the economic storage of heat (and other energy) in heat-storage devices in which sensible or latent heat can be stored is a central question, since the heat losses increase with increasing storage time. Thus, for storage of sensible heat, water constitutes the simplest storage medium but it is uneconomical for long-term storage devices. Other storage media are latent heat-storage devices that use latent heat taken up and given off during phase transitions such as the heat of melting, heat of vaporization, and heat of crystallization.

Latent heat-storage devices are known and contain water, Glauber's salt, natural stone, synthetic stone, or fired alumina such as chamotte as the heat-storage medium. Although water with a specific heat capacity of 4.18 kJ/kg·K (kilojoule per kilogram×Kelvin) has the highest specific heat capacity of all elements, a storage temperature of greater than 82° C. is problematical since at this temperature, the minerals dissolved in the water precipitate and deposit as so-called boiler scale. Due to the boiling point of 100° C. at standard pressure and the resulting increasing vapor pressure, pressure problems arise with increasing temperature.

For Glauber's salt, the melting or solidification temperature in the aggregate change of state from solid to liquid or vice versa, from liquid to solid, must be considered in heat-storage. However, Glauber's salt only permits a limited number of aggregate changes of state. Thereafter it remains in the liquid state.

For natural stone materials such as, e.g., basalt, or synthetic stones or fired alumina such as chamotte, use as a heat-storage device is limited to high temperatures due to the low specific heat capacity.

Heat-transfer fluids (HTF) with addition of metal dusts are known, which however cannot be used in the chemical industry in chemical reactors with heat exchangers since in case of a tube rupture, there is a high risk of explosion due to the fine metal particles, especially metal particles, such as lead or mercury which must not reach the soil due to their high toxicity.

It was therefore the goal of the invention to create a heat-transfer concentrate for heat-transfer media for storage or for transport of heat that allows inexpensive storage of heat, is stable, nontoxic, and not explosive, as well as indicating a process for its preparation and its use, and a high-capacity latent heat-storage device.

The object of the invention is therefore a heat-storage concentrate characterized by a storage-stable dispersion of a heat-transfer medium and at least one fine-particle and/or high-porosity solid to which gallium has been adsorbed.

An additional object of the invention is a process for preparation of this heat-transfer concentrate which is characterized by the fact that a heat-transfer medium with at least one fine-particle and/or high-porosity solid and gallium, preferably in liquid form, are mixed, and the gallium is caused to homogeneously adsorb to the fine-particle and/or high-porosity solid as a result of mixing and the effects of the high mixing energy, e.g., using a high-speed homogenizer, and the solid particles laden with gallium are homogeneously dispersed.

An additional object of the invention is a heat-transfer mixture prepared from the heat-transfer concentrate prepared as per the invention, as well as a heat-transfer medium.

An additional object of the invention is the use of the heat-transfer concentrate of the invention in heat-transfer mixtures for storage and transfer of heat in reactors with heat exchangers, for use in heat pumps, and as a medium for thermochemical energy storage.

An additional object of the invention is a latent heat-storage device comprising a storage vessel 1, a primary heating circuit 2, a secondary heating circuit 3 for removal of the heat latently stored in a heat-storage medium 4, characterized by the fact that the heat-storage medium 4 consists of a heat-transfer mixture of the invention consisting of the heat-transfer concentrate of the invention and a heat-transfer medium.

DETAILED DESCRIPTION OF THE INVENTION

Figure 1:
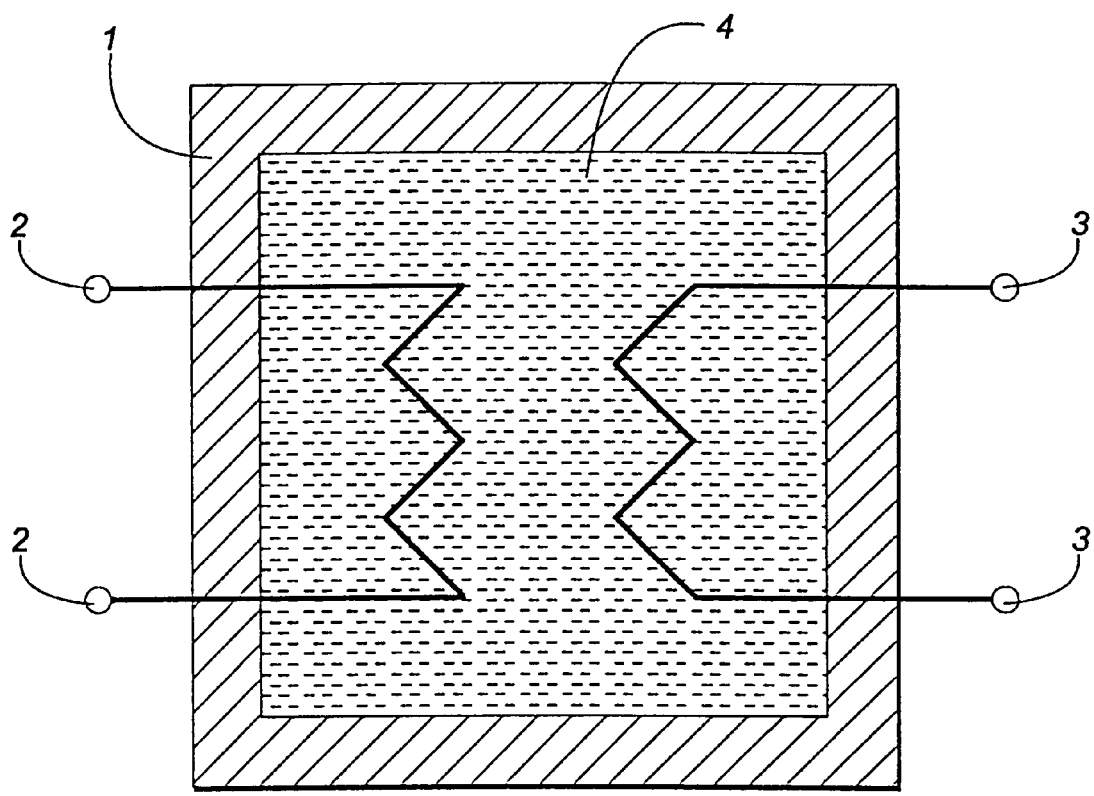
FIG. 1 shows a latent heat-storage device of the present invention.

In principle, all heat-transfer media known to those skilled in the art can be used as long as the gallium can be dispersed into it in the presence of fine-particle and/or high-porosity solids to an adequately high extent. In particular, known liquid, crystalline, or pasty glycols, low-viscosity silicone oils, and synthetic oils can be used as heat-transfer media.

It was recognized in the invention that gallium can be dispersed into heat [transfer] media in the presence of fine-particle and/or high-porosity solids to form stable dispersions.

Zeolites are preferably used as solids, especially those with a particle diameter in the range of 1–3 μm, especially from 1.5–2.1 μm, and whose pore diameters are in the range of 0.2–0.6 nm, especially from 0.3–0.5 nm. Hydrophilic or hydrophobic silicon dioxide or a mixture thereof can preferably also be used. As extremely fine particulate hydrophilic or hydrophobic silicon dioxide, commercially available AEROSIL consisting of spherical particles is used. This AEROSIL can be used in the form of an aqueous dispersion or as a dry powder.

As fine-particle and/or high-porosity solids, preferably finely ground silicates, aluminates, and ground plastics can also be used.

In using, for example, crystalline polyethylene glycols as heat-transfer medium for a latent heat-storage device, the heat-transfer concentrate is prepared in that crystalline polyethylene glycol is initially heated to above its melting point and gallium is subsequently dispersed into the liquid glycol phase as per the process of the invention using a high-speed homogenizer at 18,000 rpm. For example, for use in a latent heat-storage device, this heat-storage concentrate can also be mixed with other crystalline glycols that can have a higher melting temperature than the crystalline glycol use for preparation of the heat-transfer concentrate. If a soft or pasty heat-transfer concentrate is desired, one can use only one low-viscosity glycol, i.e., a liquid, and subsequently mix this with crystalline glycol. Depending on the molecular weight of the glycol, one can differentiate between liquid, soft, pasty, or hard-waxy products. Liquid glycols have a molecular weight of 190–630 g/mol. Soft to hard-waxy glycols have a molecular weight of 950–35,000 g/mol. A mixture of glycols of various molecular weights can be used and can be calculated by the formula:

Molecular weight=(56,110×2)/HN in which HN is the hydroxy number.

The use of glycols as the heat-transfer medium in latent heat-storage devices leads to a substantially higher total stored heat compared to water, as a comparison of crystalline polyethylene glycols with water shows, for example.

Crystalline polyethylene glycols (PEG), which are neither toxic nor volatile, have a specific heat capacity in the range of 2.1–2.5 kJ/kg·K. An amount of 1,000 kg PEG can be heated to 180° C. and cooled again as often as desired without the occurrence of technical problems [and] without losing the capacity of the aggregate to change its state. In this manner, an amount of heat of maximally 400 MJ (at 20° C. starting temperature) can be stored. If one considers that upon removal of the stored heat, the heat of melting or solidification of 167–212 kJ/kg liberated during the liquid-to-solid phase transition with 1000 kg of heat-storage medium consisting of PEG, a total stored heat of 612 MJ=170 kWh can be recovered. By contrast, with the same 1000 kg amount of water, a filling temperature of 12° C., and a final temperature of 82° C., only 293 MJ=81.454 kWh can be stored.

The disadvantage of the lesser thermal conductivity of the glycols (0.22 W/mK) compared to water (0.57 W/mK) is not only eliminated by the presence of the dispersed gallium in the heat-transfer concentrate of the invention which is later to be mixed with the heat transport medium of the same kind, but the thermal conductivity of the heat-transfer medium can be adjusted to a higher level (>1 W/mK) than water depending on the degree of enrichment with gallium. In preparation of the heat-transfer mixtures of the invention, in order to keep the amounts of heat-transfer concentrate of the invention to be added to the heat-transfer medium as low as possible, the heat-transfer concentrate of the invention should have as high a proportion of gallium as possible. This means that in the process of the invention for preparation of the heat-transfer concentrate, gallium can be dispersed into the heat-transfer medium in the presence of fine-particle and/or high-porosity solids to the point of saturation.

In preparation of heat-transfer concentrates using, for example, liquid glycols, dispersing can be done in the presence of dispersing aids. The choice of dispersing aid is a function of the heat-transfer medium with which the heat-transfer concentrate of the invention will later be mixed. If, for example, the latent heat-storage device is to be operated with liquid glycol, for example, low-viscosity glycols such as diethylene glycol or triethylene glycol or glycol ethers, for example, ethylene glycol monobutyl ether, are suitable as dispersing aids. If silicone oils or synthetic oils are chosen as heat-transfer medium for use in the latent heat-storage device, then low-viscosity silicone oils, for example, Baysilon M5 or M50 from Bayer AG are suitable as dispersing aids, or in using synthetic oils, heat-transfer oils such as Transal 593 from BP, Marlotherm from Hüls AG, or Santotherm from Monsanto [are suitable] which can then be appropriately mixed with higher viscosity silicone oils or synthetic oils [respectively].

In the preparation of a heat-transfer mixture from the heat-transfer concentrate of the invention and a heat-transfer medium, the total amount of gallium in the heat-transfer mixture is not critical and in principle, any desired mixture of the heat-transfer concentrate of the invention and the heat-transfer medium could be adjusted, however, advantageous results are obtained if the heat-transfer mixture is adjusted in such a manner that one liter of heat-transfer medium contains 2–8 g of the heat-transfer concentrate of the invention which [in turn] contains approximately 50 wt % or more gallium.

It was found, surprisingly, that gallium metal, with a low melting point of 29.6° C., can be processed into storage-stable dispersions in the heat-transfer medium, preferably glycols, low-visosity silicone oils, and synthetic oils, in the presence of fine-particle and/or high-porosity solids with a high-speed homogenizer.

In order to obtain a homogeneous dispersion, the speed of the mixing blade of the high-speed homogenizer is approx. 18,000 rpm.

The dispersing time in the homogenizer is preferably 5 min.

The heat-transfer concentrate of the invention can be further stabilized by addition of anionic and/or cationic surfactants, polyacrylic acids, and gels, which in the crude state, e.g., of a heat-transfer fluid, form a lattice structure which breaks down in the agitated state, but the viscosity of the heat-transfer fluid is not affected.

Although in using zeolites for additional stabilization of the dispersion of the heat-transfer concentrate of the invention, it is advantageous to use Rhodopol (an anionic polymer that is soluble in ethylene glycol at 65° C., guar meal, and/or carob meal, especially in a weight ratio of Rhodopol to carob meal of 60:40; in using extremely fine particulate hydrophilic and/or hydrophobic silicon dioxide, the addition of further stabilizing agents is not needed since a very good storage stability of the gallium dispersion is obtained even without additional stabilizing agents.

As microscopic studies have shown, in dispersing of gallium in the presence of zeolites in the heat-transfer fluid, the gallium is pressed through the pores of the zeolite and the zeolite particles are surrounded by the gallium particles at an extremely thin wall thickness so that there is a barely measurable increase in the size of the zeolite particles.

In a further embodiment of the invention, graphite powder of particle size $\leq 5$ µm can also be dispersed into heat-transfer concentrate during its preparation to improve the thermal conductivity. The graphite powder can be added to the homogenizer and dispersed at approximately 18,000 rpm in preparing the heat-transfer concentrate of the invention. In using crystalline glycols, these are melted prior to dispersing [of the graphite].

Since especially the use of crystalline glycols (PEG) permits temperatures greater than 100° C., oxidation stabilizers can be added to prevent oxidation of the glycols. These can be chosen from among trimethyldihydroquinoline, diphenylamine derivatives, phenothiazine, and phenyl-α-naphthylamine.

In a further advantageous embodiment of the invention, the heat-transfer concentrate can also contain a gallium alloy; in particular, by choice of a suitable gallium alloy, the melting point can be adjusted in such a manner that it agrees with the melting point, for example, of the crystalline glycol used as the heat-transfer medium, or that it lies in the average working temperature range or higher of the heat-transfer medium of a collector so that upon removal of energy from the latent heat-storage device, the heat of solidification of the gallium alloy is recovered in addition to the heat of solidification of the crystalline glycol.

In preparation of the heat-transfer concentrate of the invention, it is observed that during the first 5 min of homogenization of the gallium in the presence of zeolites in the heat-transfer fluid, there is a linear increase in the temperature, whereas after approximately 5.5 min, one can detect a temperature increase that proceeds nearly exponentially. This phenomenon can be traced to the occurrence of heat of adsorption during the adsorbing of the gallium onto the zeolite and can also be expected for extremely fine-particle hydrophilic and/or hydrophobic silicon dioxide or other fine-particle solids. In this, the point in time of the appearance of the heat of adsorption is determined by the stirring energy (revolutions/minute), the mass of zeolite, the mass of gallium, and the viscosity of the heat-transfer fluid.

Since gallium is desorbed from the zeolites during heat addition to a heat exchanger (this can also be expected for other fine-particle and/or high-porosity solids), the heat-storage medium of the invention can also be advantageously used for thermochemical energy storage.

The use of the heat-storage medium of the invention in heat pumps is promising since an additional energy gain can be obtained from the heat of melting (heat of solidification) due to the low melting temperature of 29.6° C.

The heat-storage medium of the invention can be used for storage and transport of heat in reactors with heat exchangers and for use in heat pumps.

A latent heat-storage device as per the invention is shown in FIG. 1. It consists of a storage vessel 1, a primary heating circuit 2, a secondary heating circuit 3 for removal of the heat latently stored in a heat-storage medium 4, wherein the heat-storage medium 4 consists of a heat-transfer mixture of the invention which consists of the heat-transfer concentrate of the invention in admixture with a heat-transfer medium which can advantageously be chosen from liquid, crystalline, or pasty glycols, low-viscosity silicone oils, or synthetic oils.

The invention is described in more detail below on the basis of examples.

EXAMPLE 1

Preparation of a heat-transfer concentrate for use in a heat-storage medium based on glycol If the heat-storage medium is based on glycol, ethylene glycol monobutyl ether is filled into a homogenizer with a capacity of 1 L in combination with diethylene glycol and/or triethylene glycol as dispersing liquid (heat-transfer fluid), for example, in the following amounts:

| | |
|---|---|
| Triethylene glycol | 200 mL |
| Ethylene glycol monobutyl ether | 50 mL |
| Zeolite with a particle size of | <4 µm |
| and a pore size of approximately | 0.4 nm |
| (Wessalith NP from Degussa) | 20 g |
| Silica (e.g., AEROSIL from Degussa) | 2 g |
| Gallium | 200 g |

In order to obtain a homogeneous dispersion, the speed of the grinding bade of the high-speed homogenizer is set to approximately 18,000 rpm. The dispersing time in the homogenizer is preferably 5 min.

This heat-transfer concentrate is then added, depending on the desired degree of enrichment, in amounts of 2, 4, or 8 g or more per liter to a chosen heat-storage medium based on glycol. Such a heat-storage medium can be, for example, Glythermin P44, Glythermin NF, or Glythermin 200 from BASF. By mixing of the heat-transfer concentrate of the invention into a heat-storage medium, a heat-transfer mixture of the invention is obtained that can be used, for example, in a latent heat-storage device.

For further storage stabilization of the gallium particles in the ready-to-use, low-viscosity heat-storage medium, an anionic polymer, for example Rhodopol xanthan, can be added in an amount of 0.5 g per liter of heat-storage medium. Mixing of the heat-transfer concentrate of the invention with a heat-storage medium can be done with conventional stirring equipment, that is, homogenization of the concentrate in the heat-transfer mixture in a high-speed homogenizer is no longer needed.

If pasty or crystalline glycols, for example polyethylene glycol (PEG), are used as heat-storage medium in a latent heat-storage device for storage of heat energy, dispersing of the gallium is done as described above. The low-viscosity glycol such as diethylene glycol or triethylene glycol only alters the molecular weight of the PEG to a slight extent so that the advantage of higher heat-storage from PEG as a result of the heat of melting or solidification of 167–207 kJ/kg glycol during the phase transition can be extensively retained and exploited. Although it has been shown that 2–8 g of the heat-transfer concentrate of the invention (with a weight proportion of approximately 50% or more of gallium) per liter heat-storage medium leads to an adequate increase of the thermal conductivity of, for example, crystalline glycols, those skilled in the art can also choose other ranges here as desired. In addition, graphite with a particle size of <5 µm can also be incorporated into the heat-transfer concentrate of the invention or the heat-transfer mixture of the invention.

EXAMPLE 2

Heat-transfer concentrate based on silicone oil

| | |
|---|---|
| Silicone oil (Baysilon M5) | 200 mL |
| Zeolite with a particle size of | <4 µm |
| and a pore size of approximately | 0.4 nm |
| (Wessalith NP from Degussa) | 20 g |
| Silica (e.g., AEROSIL from Degussa) | 2 g |
| Gailium | 200 g |

This concentrate obtained after treatment in a high-speed homogenizer as in Example 1 can then be further processed to produce a heat-storage medium of the invention with other commercially available conventional silicone oils.

EXAMPLE 3

Concentrate based on heat-transfer oils (synthetic oils)

One proceeds in the same manner as in Example 1, however a heat-transfer oil is used as the dispersing liquid into which the gallium is dispersed to prepare the heat-transfer concentrate of the invention. As dispersing liquids, heat-transfer oils such as Transal 593 from BP, Marlotherm from Hüls AG, or Santotherm from Monsanto are suitable.

EXAMPLE 4

Preparation of a heat-transfer fluid containing stable dispersed gallium

Although is it simpler to prepare a heat-storage mixture of the invention by mixing a heat-transfer concentrate of the invention with a heat-storage medium, a stable dispersion of a heat-storage medium and gallium can also be prepared directly (suitable when small amounts are desired) without previously preparing the heat-transfer concentrate of the invention.

For this purpose, 4 g zeolite and 5 drops gallium are added to 200 mL heat-transfer fluid (glycol) with the aid of a pipette in a laboratory experiment. The weight of gallium is approximately 1 g. Subsequently [the mixture] is dispersed in a high-speed homogenizer at 18,000 rpm until the heat-transfer fluid has a uniform anthracite-black color after a dispersing time of 5 min. A surface distribution of gallium particles of approximately 2000 m² is obtained.

In another laboratory experiment, 0.8 g extremely finely divided hydrophobic silicon dioxide (AEROSOL [sic; AEROSIL]) and 5 drops of gallium are added to 200 mL heat-transfer fluid (low-viscosity silicone oil) with the aid of a pipette. The weight of the gallium is approximately 1 g. Subsequently [the mixture] is dispersed with a high-speed homogenizer at 18,000 rpm until the heat-transfer fluid has a uniform anthracite-black color after a dispersing time of 5 min. A stable gallium dispersion is obtained.

We claim:

1. A heat-transfer concentrate comprising a storage-stable dispersion of a heat-transfer effective amount of a heat-storage medium and a heat-transfer effective amount of gallium wherein the gallium is adsorbed onto a solid having either a particle diameter of 1 to 3 $\mu$m or a pore diameter of 0.2 to 0.6 nm, or both.

2. The heat-transfer concentrate of claim 1, wherein the heat-storage medium is selected from the group consisting of glycol, silicone oil, synthetic oil, and a mixture thereof.

3. The heat-transfer concentrate of claim 1, wherein the solid comprises a zeolite.

4. The heat-transfer concentrate of claim 3, wherein the zeolite has a particulate diameter of 1.5 to 2.1 $\mu$m.

5. The heat-transfer concentrate of claim 3, wherein the zeolite has a pore diameter of 0.3 to 0.5 nm.

6. The heat-transfer concentrate of claim 1, wherein the solid comprises a hydrophilic or hydrophobic silicon dioxide, or a mixture thereof.

7. The heat-transfer concentrate of claim 1, wherein the solid comprises silicate.

8. The heat-transfer concentrate of claim 1, wherein the solid comprises aluminate.

9. The heat-transfer concentrate of claim 1, wherein the solid comprises ground plastic.

10. The heat-transfer concentrate of claim 1, further comprising a stabilizing agent or a dispersing aid.

11. The heat-transfer concentrate of claim 10, wherein the stabilizing agent is selected from the group consisting of anionic or cationic surfactants, polyacrylic acids, gels, and a mixture thereof, and wherein the dispersing aid is selected from the group consisting of glycol, glycol-ether, silicone oil and a mixture thereof.

12. The heat-transfer concentrate of claim 10, wherein the stabilizing agent is selected from the group consisting of an anionic polymer, guar meal, carob meal, and a mixture thereof, and wherein the dispersing aid is selected from the group consisting of triethylene glycol, ethylene glycol monobutyl ether, polydimethylsiloxanes and a mixture thereof.

13. The heat-transfer concentrate of claim 12, wherein anionic polymer and carob meal are present in a weight ratio of 60:40.

14. The heat-transfer concentrate of claim 1, further comprising a heat-transfer effective amount of graphite.

15. The heat-transfer concentrate of claim 14, wherein the graphite has a particle size of less than 5 $\mu$m.

16. The heat-transfer concentrate of claim 1, further comprising an oxidation stabilizer.

17. The heat-transfer concentrate of claim 16, wherein the oxidation stabilizer is selected from the group consisting of trimethyldihydroquinolone, diphenylamine derivatives, phenothiazine, penyl-a-naphthylamine, and a mixture thereof.

18. The heat-transfer concentrate of claim 1, wherein the gallium is a gallium alloy.

19. The heat-transfer concentrate of claim 18, wherein the gallium alloy has a melting point of at least as high as the temperature of a heat-transfer effective amount of heat-storage medium.

20. The heat-transfer concentrate of claim 2, wherein the glycol is crystalline polyethylene glycol.

21. A process for preparing a heat-transfer concentrate, comprising:
a. melt mixing a heat-transfer effective amount of a heat-storage medium, a heat-transfer effective amount of a solid having either a particle diameter of 1 to 3 $\mu$m or a pore diameter of 0.2 to 0.6 nm, or both, and a heat-transfer effective amount of gallium in liquid form;
b. uniformly adsorbing the gallium onto the solid; and
c. homogeneously dispersing the solid laden with gallium and the heat storage medium.

22. The process of claim 21, wherein the heat-storage medium is selected from the group consisting of glycol, silicone oil, synthetic oil and a mixture thereof.

23. The process of claim 21, wherein the solid comprises a zeolite.

24. The process of claim 23, wherein the zeolite has a particulate diameter of 1.5 to 2.1 $\mu$m.

25. The process of claim 23, wherein the zeolite has a pore diameter of 0.3 to 0.5 nm.

26. The process of claim 21, wherein the solid comprises a hydrophilic or hydrophobic silicon dioxide, or a mixture thereof.

27. The process of claim 21, wherein the solid comprises silicate.

28. The process of claim 21, wherein the solid comprises aluminate.

29. The process of claim 21, wherein the solid comprises ground plastic.

30. The process of claim 21, wherein the solid laden with gallium is dispersed in the heat-storage medium to the point of saturation.

31. The process of claim 22, wherein the glycol is a crystal glycol and the melt mixing step occurs at a temperature above the melting point of the crystal glycol to form a liquid glycol phase prior to the dispersing step.

32. The process of claim 31, wherein silicon dioxide is mixed into the liquid glycol phase.

33. The process of claim 21, wherein the gallium is a gallium alloy.

34. The process of claim 33, wherein the gallium alloy has a melting point of at least as high as the temperature of the heat-storage medium.

35. The process of claim 22, wherein the glycol is crystalline polyethylene glycol.

36. The process of claim 21, wherein a heat transfer effective amount of graphite is further dispersed with the heat-storage medium, the solid and the gallium in the dispersing step.

37. The process of claim 36, wherein graphite has a particle size of less than 5 $\mu$m.

38. The process of claim 23, wherein the zeolite has a particle diameter of 1.9 $\mu$m and a pore size of 0.4 nm.

39. The process of claim 21, wherein the dispersing step is performed with a grinding blade rotating at approximately 18,000 rpm.

40. The process of claim 21, wherein a stabilizing agent or a dispersing aid, or a mixture thereof are further dispersed with the heat-storage medium, the solid and the gallium in the dispersing step.

41. The process of claim 40, wherein the stabilizing agent is selected from the group consisting of anionic or cationic surfactants, polyacrylic acids, gels, and a mixture thereof, and wherein the dispersing aid is selected from the group consisting of glycol, glycol-ether, silicone oil and a mixture thereof.

42. The process of claim 40, wherein the stabilizing agent is selected from the group consisting of an anionic polymer, guar meal, carob meal, and a mixture thereof, and wherein the dispersing aid is selected from the group consisting of triethylene glycol, ethylene glycol monobutyl ether, polydimethylsiloxanes and a mixture thereof.

43. The process of claim 42, wherein anionic polymer and carob meal are present in a weight ratio of 60:40.

44. The process of claim 40, wherein the dispersing step occurs for approximately 5 minutes.

45. A heat-transfer mixture that can store heat comprising a heat-transfer effective amount of the heat-transfer concentrate of claim 1.

46. A heat-transfer mixture of claim 45, wherein the heat-storage medium is selected from the group consisting of glycol, silicone oil, synthetic oil, and mixtures thereof.

47. A heat-transfer mixture of claim 45, wherein 2 to 8 grams heat-transfer concentrate are contained in 1 liter of heat-storage medium.

48. A method of using a heat-transfer mixture, comprising storing and transporting heat in the heat-transfer mixture of claim 45 in reactors with heat exchangers.

49. A method of using a heat-transfer mixture, comprising utilizing the heat-transfer mixture of claim 45 in a heat pump.

50. A method of using a heat-transfer mixture, comprising utilizing the heat-transfer mixture of claim 45 as a medium for thermochemical energy storage.

51. A latent heat-storage device comprising a storage vessel, a primary heating circuit, and a secondary heating circuit for removal of heat latently stored in the heat-transfer mixture of claim 45.

* * * * *

UNITED STATES PATENT AND TRADEMARK OFFICE
CERTIFICATE OF CORRECTION

PATENT NO. : 6,022,487

DATED : February 8, 2000

INVENTOR(S) : Daume et al.

It is certified that error appears in the above-identified patent and that said Letters Patent is hereby corrected as shown below:

Title page, item
[30] Foreign Application Priority Data delete reference to "Jan. 14, 1995 [DE] Germany ................... 195 00 040" and replace therefore the following reference:

-- Jan. 14, 1995 [DE] Germany................... 195 00 949 --

Signed and Sealed this

Sixth Day of February, 2001

*Attest:*

Q. TODD DICKINSON

*Attesting Officer*     *Director of Patents and Trademarks*